United States Patent [19]

Simmons et al.

[11] Patent Number: 5,742,457
[45] Date of Patent: Apr. 21, 1998

[54] HORIZONTAL SHARED-POLE MAGNETIC READ/WRITE HEAD HAVING POLARIZATION CONDUCTOR DISABLING WRITE POLE

[75] Inventors: Randall G. Simmons, San Jose, Calif.; Robert E. Jones, Jr., Pittsburgh, Pa.

[73] Assignee: International Business Machines Corporation, Armonk, N.Y.

[21] Appl. No.: 599,431

[22] Filed: Jan. 17, 1996

[51] Int. Cl.[6] .............................. G11B 5/127; G11B 5/33
[52] U.S. Cl. .......................... 360/113; 360/121; 360/125
[58] Field of Search ................................ 360/113, 119, 360/121, 125, 126

[56] References Cited

U.S. PATENT DOCUMENTS

| | | | |
|---|---|---|---|
| 5,229,904 | 7/1993 | Ito et al. | 360/121 |
| 5,255,141 | 10/1993 | Valstyn et al. | 360/126 |
| 5,270,895 | 12/1993 | Ruigrok et al. | 360/126 |
| 5,345,354 | 9/1994 | Ito et al. | 360/121 |
| 5,434,733 | 7/1995 | Hesterman et al. | 360/113 |
| 5,436,779 | 7/1995 | Valstyn | 360/113 |

*Primary Examiner*—Stuart S. Levy
*Assistant Examiner*—William R. Korzuch
*Attorney, Agent, or Firm*—Merchant, Gould, Smith, Edell, Welter & Schmidt, P.A.

[57] ABSTRACT

An inductive-write magnetoresistive-read horizontal head for magnetic recording having two polarization conductors. The two polarization conductors are used to simultaneously activate a MR sensor and to disable the write head during the read back process to eliminate the secondary read back signal from the inductive-write head. During the read process, the current through a first conductor biases the MR stripe while current through the second conductor generates an applied field to switch the magnetization of the permalloy in the write head pole and reduce the permeability. The head incorporates write-wide read-narrow head attributes and has the reliability advantages associated with yoke or recessed MR or GMR structures. The magnetoresistive stripe may be disposed directly in the gap of the heads or it may be recessed.

29 Claims, 3 Drawing Sheets

HORIZONTAL SHARED-POLE MAGNETIC READ/WRITE HEAD HAVING POLARIZATION CONDUCTOR DISABLING WRITE POLE

BACKGROUND OF THE INVENTION

1. Field of the Invention

This invention relates in general to an inductive-write magnetoresistive-read horizontal head for magnetic recording, and more particularly, to a horizontal magnetic head having two polarization conductors to simultaneously disable the write head during the read back process to eliminate the secondary read back signal from the inductive-write head.

2. Description of Related Art

Magnetic heads or transducers typically employ inductive elements for recording and reading data. As is well known, magnetic heads may comprise permalloy layers that provide a transducing gap at which varying flux signals result in data being recorded on a magnetic disk during the write mode. During the read mode, magnetic flux representative of the recorded signals is sensed at the transducing gap to produce electrical signals which are read out for further utilization.

In the past, magnetoresistive (MR) devices have been used as flux sensing elements to implement the readout function. In a conventional MR head, the MR element and a biasing element, which is either a conductor or a magnetic layer, are positioned in a gap formed between two flux guide elements.

In known magnetic heads, a write gap and a read gap are formed distinctly. In this configuration, a central flux guide is disposed between the read flux guide and the write flux guide and forms part of a magnetic yoke of the write portion as well as of the magnetic yoke of the read portion of the magnetic head. It is known that a write gap may function as a read gap when information is being read. This phenomenon is utilized in a structure in which information is written and read by one and the same head element which includes separate write and read gaps therein. However, in this type of write/read magnetic head, the write gap functioning as a read gap has the detrimental result that a part of the magnetic flux of the passing medium which is opposite the write gap is guided towards the magnetoresistive element via the shared central flux guide. As a result, extra magnetic pulses are introduced into the magnetoresistive element in the case of, for example, a medium comprising digital information. These pulses interfere with the magnetic pulses guided towards the magnetoresistive element via the read gap, and perturb the signal to be measured thereby detrimentally influencing the signal-to-noise ratio.

The detrimental phenomenon described above, which occurs in the known magnetic head during operation, is elucidated as follows. If it is assumed that a small magnetized area on a recording medium, for example, a magnetic tape or disk, is present just in front of the write gap. This area can be considered to be an almost ideal flux source due to the low permeability of the medium. A part of the flux, which is dependent on the distance from and the size of the write gap, will enter the write portion via the outer flux guide adjacent to the write gap and will leave the write portion via the central flux guide, or vice versa. The greater part of the magnetic flux entering the write portion returns to the contact face via the magnetic yoke of the write portion. This part of the flux subsequently traverses the sensitive magnetoresistive read element. Dependent on the direction of movement of the medium, the part of the flux traversing the magnetoresistive element gives rise to an extra pulse before or after the main pulse which results from reading said magnetized area by the magnetic head.

Moreover, when information is being written, the quantity of magnetic flux generated by the inductive element and guided towards the magnetoresistive element via the shared flux guide may be so much that the magnetoresistive element is destabilized, which may considerably reduce its sensitivity.

Attempts have been made to eliminate or minimize the contribution from the write circuit. For example, U.S. Pat. No. 5,270,895, issued Dec. 14, 1993, to Ruigrok et al., entitled "COMBINED READ/WRITE THIN-FILM MAGNETIC HEAD WITH COMPOSITE SHARED FLUX GUIDE", incorporated herein by reference, discloses a read portion including a magnetoresistive element, a write portion including an inductive element, and a shared flux guide between the read and write portions. Ruigrok separates the read and write functions by providing the shared flux guide as a sandwich structure of two soft magnetic layers separated by an insulating layer, except that the soft magnetic layers are interconnected in a magnetically conducting manner proximate to the head face. In this vertical head configuration, the secondary read back signal from the inductive-write head is not disabled, but rather is physically diverted away from the magnetoresistive element.

Another example of a read/write head which attempts to eliminate or minimize the contribution from the write circuit is disclosed in U.S. Pat. No. 5,255,141, issued Oct. 19, 1993, to Valstyn et al., entitled "READ-WRITE MAGNETIC HEAD WITH FLUX SENSING READ ELEMENT", which is incorporated herein by reference. Valstyn discloses providing a bypass around the magnetoresistive element during the write operation. The bypass is normally operable thereby bypassing the magnetoresistive element. However, during a read operation, a saturation current is applied to the magnetic valve conductor to open the shunt path thereby bypassing the magnetoresistive element. Again this is a vertical head configuration, and only one gap is provide for performing the write and read functions. Thus, a secondary read back signal form an inductive-write head is simply not present. Rather, the magnetic valve acts as a switch to allow the flux sensing element to sense signals only during read operations.

It can be seen then that there is a need for an inductive-write, magnetoresistive-read magnetic head which eliminates the secondary read back signal from the inductive-write head in head structures having both an inductive-write head and a yoke or recessed magnetoresistive-read (MR) with a shared pole.

It can also be seen that there is a need for a head structure which incorporates two polarization conductors, one to bias the magnetoresistive stripe and the second to simultaneously disable the write head during the read back process.

Still further, it can be seen that there is a need for a magnetic head structure having a shared pole design that minimizes the offset between write and read functions.

SUMMARY OF THE INVENTION

To overcome the limitations in the prior art described above, and to overcome other limitations that will become apparent upon reading and understanding the present specification, the present invention discloses an inductive-write magnetoresistive-read horizontal head for magnetic recording having two polarization conductors to simultaneously disable the write head during the read back process to eliminate the secondary read back signal form the inductive-write head.

The present invention solves the above-described problems by providing an inductive-write magnetoresistive-read (MR) head with two polarization conductors. During the read process, the current through a first conductor biases the MR stripe while current through the second conductor generates an applied field to switch the magnetization of the permalloy in the write head pole and reduce its permeability.

A system in accordance with the principles of the present invention comprises a horizontal magnetic read/write head having a portion of a magnetic pole structure including a read and a write pole tip formed in a plane parallel to a recording media and a magnetoresistive (MR) read sensor recessed with respect to the plane. A first polarization conductor is disposed proximate the MR read sensor to provide a bias sensor field to the MR read sensor during a read process and a second polarization conductor is disposed proximate the write pole to provide a magnetic field that reduces the permeability of the write pole during the read process.

One aspect of the present invention is that the head incorporates write-wide read-narrow head attributes.

Another aspect of the present invention is that the magnetic head has the reliability advantages associated with yoke or recessed MR or GMR structures.

Another aspect of the present invention is that the magnetoresistive stripe may be disposed directly in the gap of the heads.

Another aspect of the present invention is that the magnetoresistive stripe may be recessed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an inductive-write magnetoresistive-read (MR) head with two polarization conductors. During the read process, the current through a first conductor biases the MR stripe while current through the second conductor generates an applied field to switch the magnetization of the permalloy in the write head pole and reduce the permeability.

Figure 1:
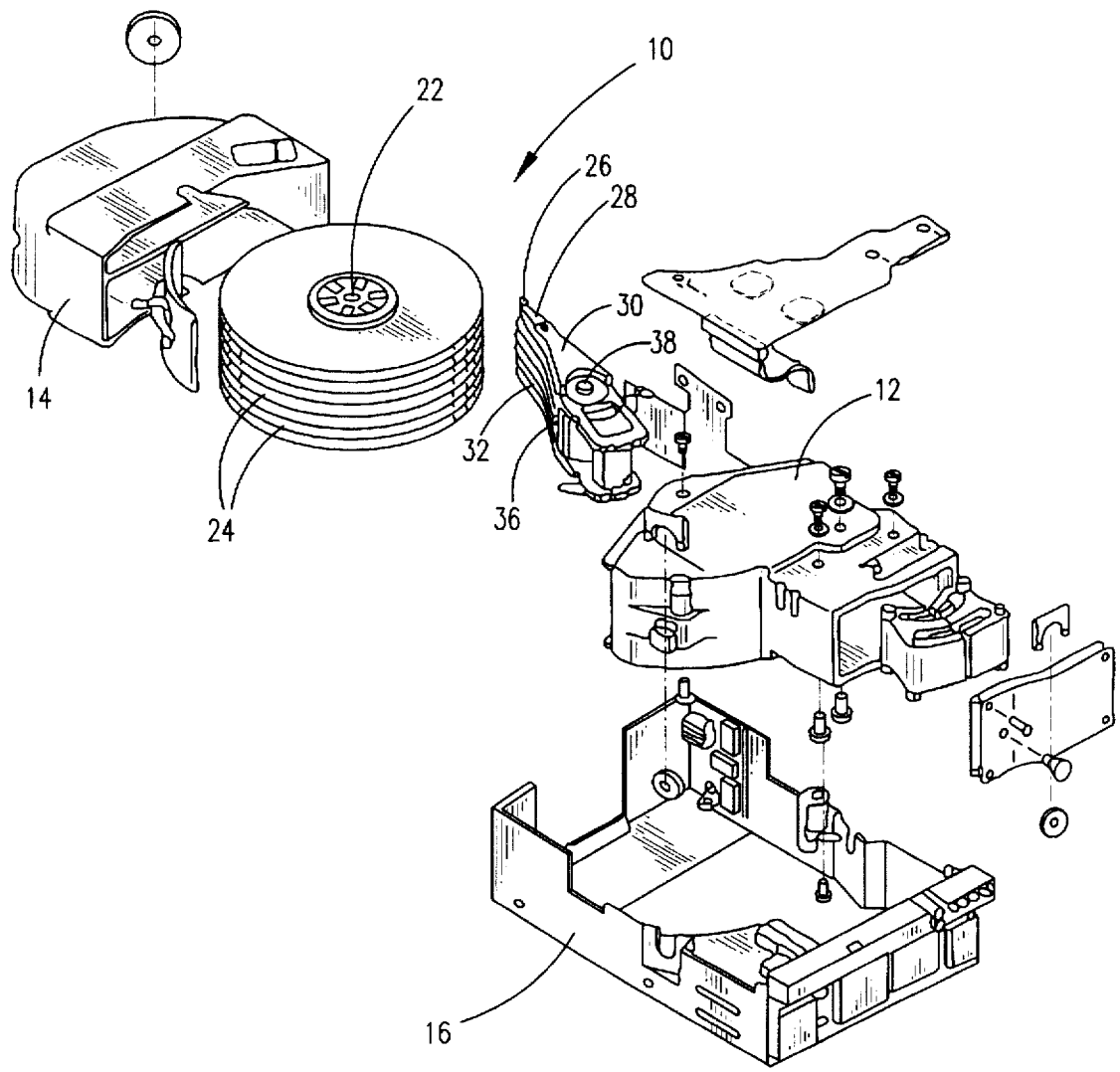
FIG. 1 is an exploded view of a disk drive operable in accordance with the invention.

FIG. 1 is an exploded view of a disk drive 10. The disk drive 10 includes a housing 12 and a housing cover 14 which, after assembly, is mounted within a frame 16. Mounted within the housing is a spindle shaft 22. Rotatably attached to the spindle shaft 22 are a number of disks 24. The disks 24 rotate on spindle shaft 22 which is powered by a motor (not shown). Information is written on or read from the disks 24 by heads or magnetic transducers (not shown) which are coupled to sliders 26. The sliders are attached to the load springs 28 which are in turn attached to separate arms 30 on an E block or comb 32. The E block or comb 32 is attached at one end of an actuator arm assembly 36. The actuator arm assembly 36 is rotatably attached within the housing 12 on an actuator shaft 38. However, the invention is not meant to be limited to the disk drive described above. Those skilled in the art will recognize that magnetic heads according to the invention are useful with all configurations of disk drives or direct access storage devices (DASD).

Figure 2:
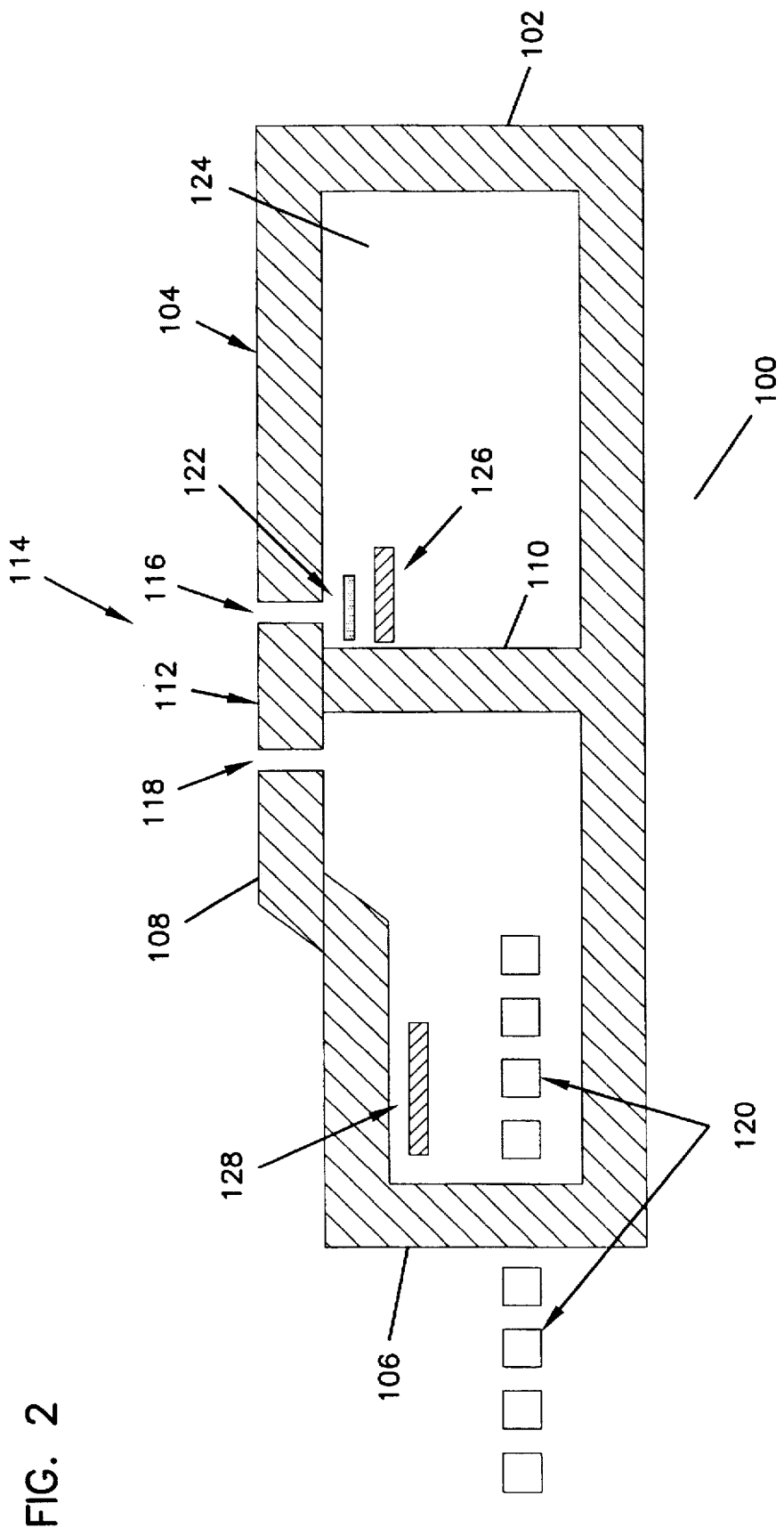
FIG. 2 is a cross sectional view of an inductive-write magnetoresistive-read head having a first polarization conductor to bias the MR stripe and a second polarization conductor to disable the write head during read back according to the present invention.

FIG. 2 illustrates a inductive-write, magnetoresistive-read horizontal head 100 for magnetic recording according to the present invention. The head 100 includes read flux guide 102 having a read pole 104 and a write flux guide 106 having a write pole 108. A central flux guide 110 is centrally located between the read flux guide 102 and the write flux guide 106, and is shared by the write flux guide 106 and the read flux guide 102. A central pole 112 is disposed at the end of the central flux guide 110 along the contact surface 114 of the head 100 which in operation is near the recording medium (not shown). A read gap 116 is disposed between the read pole 104 and the shared central pole 112. A write gap 118 is disposed between the write pole 108 and the shared central pole 112. An inductive element 120, particularly a coil or winding made of copper turns, is arranged around the write flux guide 106.

Recessed below the read gap 116, a magnetoresistive (MR) sensor element 122 is embedded in an insulating material 124. However, those skilled in the art will recognize that the MR sensor element 122 may be disposed directly in the read gap 116. The MR sensor 122 is preferably made from a permalloy material and preferably overlaps the edges of the read gap 116. A first polarization conductor 126 is disposed below the MR sensor 122 in the insulating material 124. During the read process the first polarization conductor 126 biases the MR sensor element 122 to 50% saturation. A second polarization conductor 128 is disposed below the write pole 108 near the top surface 114 of the head 100. When the MR sensor element 122 is biased to 50% saturation, the second polarization conductor 128 applies a field to switch the magnetization of the permalloy in the write pole 108 and thereby reduce the permeability or flux conductivity of the write pole 108.

The current through the write flux guide 106 will create a field, $H_i = I/W$, where I is the current in the write flux guide 106 and W is the width of the write flux guide 106. The width of the write flux guide 106 is preferably approximately equal to the width of the magnetic circuit width over it. For a current, I=10⁻³ ampere, and width W=10×10⁻⁶ meter, the field Hi=10×10⁻³/10×10⁻⁶=10 (3) ampere-turn meter⁻¹ or 12.57 Oe. The permeability without the current applied will be approximately $$\mu = \frac{B}{H_k + H_s},$$

where $H_k$ is the intrinsic anisotropy field and Hs is the field associated with the shape anisotropy. Neglecting the latter, the permeability (Hk=4 Oe), =10(4)/4=2500.

With the current applied, the permeability in the section of the write flux guide 106 over the second polarization conductor 128 becomes $$\mu_I = \frac{B}{H_k + H_s + I/W}$$

Again neglecting $H_s$, for a I=10×10⁻³ ampere and W=10×10⁻³ meter, the permeability becomes $$\mu_I = \frac{10^4}{4 + 12.57} \cong 600,$$

Thus, the flux conductivity (permeability) of the write flux guide 106 is reduced by about a factor of four. However, those skilled in the art will recognize that the write head can be further disabled by (1) adding a significant shape anisotropy, (2) increasing the current, I, and/or (3) narrowing the width, W, of the write flux guide 106 over the second polarization conductor 128.

Thus, any signal detected at the write gap 118 during the read process may be attenuated and therefore does not contribute to the read signal along the shared central flux guide 110. During the write process the second polarization conductor 128 is not energized and thus the signal representing data to be recorded created by the inductive element 120 is directed to the write gap 118. The write data signal is transduced at the write gap 118 and recorded on the magnetic medium (not shown).

Figure 3:
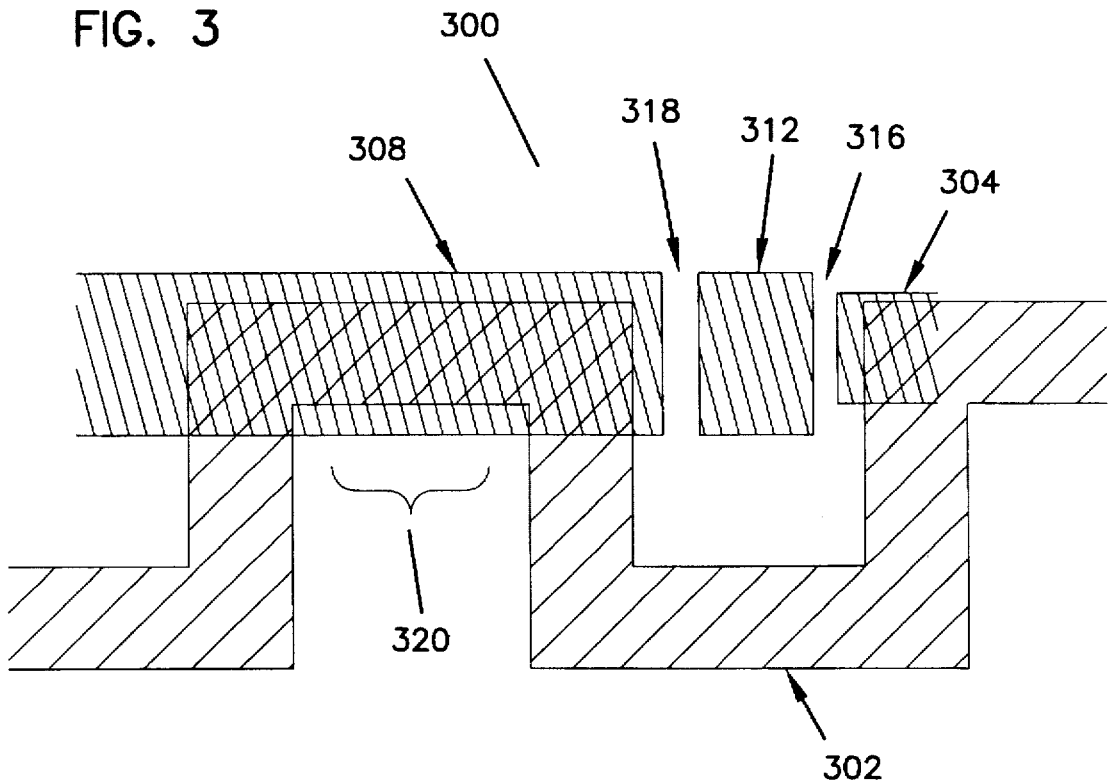
FIG. 3 is a top view of the inductive-write magnetoresistive-read head according to the present invention.

FIG. 3 is a top view of a head 300 according to the present invention wherein a unitary conductor 302 is positioned under the read 304 and write poles 308. The write gap 318 is shown between the write pole 308 and the central pole 312. The read gap 316 is shown between the read pole 304 and the central pole 312. Note that the read pole 304 has a width which is less than the write pole 308. Thus, head incorporates the write-wide read-narrow attributes of conventional MR heads, but also has the reliability advantages associated with yoke or recessed MR or GMR structures. Region 320 where the write pole 308 overlaps the unitary conductor 302 is illustrated and explained in more detailed with reference to FIG. 4 below.

Figure 4:
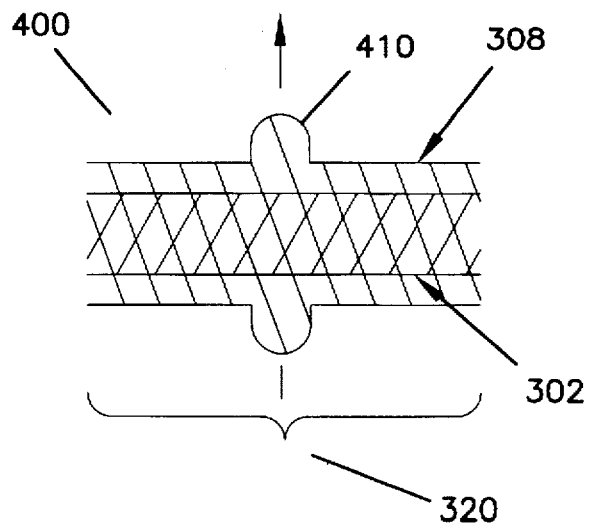
FIG. 4 is a top view of the inductive-write head region of the present invention wherein the applied field reduces the permeability to near zero thereby disabling the write head during read back.

FIG. 4 shows a magnified top view 400 of the region 320 where the write pole 308 overlaps the unitary conductor 302. To increase the applied field during the read process, the structure of the permalloy is modified to increase the contribution of shape anisotropy to the applied field. A protrusion 410 extends from the sides of the pole in this region 320 to increase the shape anisotropy field component. The field $H_{applied}$ reduces the permeability to zero. The field $H_{applied}$ is the sum of $H_{Ki} + K_{Ksa} + H_{iK}$ where $H_{iK}$=I/W, I=current, and W=width of permalloy. It is expected that an applied current in the range of 10 mamp is sufficient to bias the MR stripe and to generate an applied field $H_{applied}$ to switch the permalloy in the localized region 320 of the write pole.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A horizontal magnetic read/write head having a portion of a magnetic pole structure including a read pole, a write pole, and a shared pole formed in a plane parallel to a recording media, a write gap between the write pole and the shared pole and a read gap between the read pole and the shared pole, and a magnetoresistive (MR) read sensor recessed with respect to the plane, comprising a first and second polarization conductor, the first conductor being disposed proximate the MR read sensor to provide a bias sensor field to the MR read sensor during a read process and the second conductor being disposed proximate the write pole to provide an applied field that reduces the permeability of the write pole during the read process, wherein the write pole includes a protrusion that increases the contribution of shape anisotropy to the applied field to increase the applied field during the read process.

2. The magnetic head of claim 1 wherein the first polarization conductor biases the MR read sensor to 50% saturation.

3. The magnetic head of claim 1 wherein the write pole comprises permalloy having a predetermined magnetic field orientation.

4. The magnetic head of claim 3 wherein the application of a field to the write pole by the second polarization conductor switches the magnetization of the permalloy.

5. The magnetic head of claim 1 wherein the permeability of the write pole is reduced by a factor of four.

6. The magnetic head of claim 1 wherein the read pole has a width less than the write pole, the write pole providing a write-wide attribute and the read pole providing a read-narrow attribute.

7. The magnetic head of claim 1 wherein the first polarization conductor and the second polarization conductor are connected in series, and wherein current is applied to the conductors to bias the MR read sensor to generate the applied field to decrease the permeability of the write pole.

8. The magnetic head of claim 1 wherein the protrusion is disposed in a region of the write pole overlapping the second conductor.

9. A magnetic head, comprising:

a first magnetic flux guide for providing a path for read signals;

a second magnetic flux guide for providing a path for write signals;

a central magnetic flux guide, disposed between the first and second magnetic flux guides and coupled thereto, for providing a path that is shared by the read and write signals and forming a read gap with the first magnetic flux guide and a write gap with the second magnetic flux guide;

flux sensing means, coupled to the read gap, for reading recording data from a magnetic recorded medium;

a transducing element, coupled to the second magnetic flux guide, for generating signals for writing data to the magnetic recording medium;

a first polarization conductor, disposed proximate to the flux sensing means, for biasing the flux sensing means to detect signals recorded on the magnetic recording medium; and a second polarization conductor, disposed proximate to the second magnetic flux guide, for generating an applied field to decrease the permeability of the second magnetic flux guide, wherein the second flux guide includes a protrusion that increases the contribution of shape anisotropy to the applied field to increase the applied field during the read process.

10. The magnetic head of claim 9 wherein the first polarization conductor biases the flux sensing means to 50% saturation.

11. The magnetic head of claim 9 wherein the second flux guide comprises permalloy having a predetermined magnetic field orientation.

12. The magnetic head of claim 11 wherein the application of a field to the second flux guide by the second polarization conductor switches the magnetization of the permalloy.

13. The magnetic head of claim 9 wherein the permeability of the second flux guide is reduced by a factor of four.

14. The magnetic head of claim 9 wherein the first flux guide has a width less than the second flux guide, the second flux guide providing a write-wide attribute and the first flux guide providing a read-narrow attribute.

15. The magnetic head of claim 9 wherein the first polarization conductor and the second polarization conductor are connected in series, and wherein current is applied to the conductors to bias the flux sensing means and to generate the applied field to decrease the permeability of the second magnetic flux guide.

16. A method of fabricating a recording head, comprising the steps of:

providing a first magnetic flux guide for read signals;

providing a second magnetic flux guide for write signals;

coupling a central magnetic flux guide between the first and second magnetic flux guides for providing a path that is shared by the read and write signals, the central magnetic flux guide forming a read gap with the first magnetic flux guide and a write gap with the second magnetic flux guide;

providing a flux sensing means below the read gap for reading data from a magnetic recording medium;

coupling a transducing element to the second magnetic flux guide for generating signals for writing data to the magnetic recording medium;

providing a first polarization conductor proximate to the flux sensing means for biasing the flux sensing means to detect signals recorded on the magnetic recording medium; and providing a second polarization conductor proximate to the second magnetic flux guide for generating an applied field to decrease the permeability of the second magnetic flux guide, wherein the second flux guide includes a protrusion that increases the contribution of shape anisotropy to the applied field to increase the applied field during the read process.

17. The method of claim 16 wherein the first polarization conductor biases the flux sensing means to 50% saturation.

18. The method of claim 16 wherein the second flux guide comprises permalloy having a predetermined magnetic field orientation.

19. The method of claim 18 wherein the application of a field to the second flux guide by the second polarization conductor switches the magnetization of the permalloy.

20. The method of claim 16 wherein the permeability of the second flux guide is reduced by a factor of four.

21. The method of claim 16 wherein the first flux guide has a width less than the second flux guide, the second flux guide providing a write-wide attribute and the first flux guide providing a read-narrow attribute.

22. The method of claim 16 wherein the first polarization conductor and the second polarization conductor are connected in series, and wherein current is applied to the conductors to bias the flux sensing means and to generate the applied field to decrease the permeability of the second magnetic flux guide.

23. A magnetic storage system, comprising:

a housing;

at least one magnetic storage disk disposed within the housing;

a spindle, coupled to the disk, the spindle having an axis of rotation;

a drive means, coupled to the spindle, for rotating the spindle and disk about the axis of rotation;

an actuator, disposed within the housing proximate to the disk;

a magnetic head, coupled to the actuator, the actuator moving the magnetic head relative to a surface of the storage disk, wherein the magnetic head comprises:

a first magnetic flux guide for providing a path for read signals;

a second magnetic flux guide for providing a path for write signals;

a central magnetic flux guide, disposed between the first and second magnetic flux guides and coupled thereto, for providing a path that is shared by the read and write signals and forming a read gap with the first magnetic flux guide and a write gap with the second magnetic flux guide;

flux sensing means, coupled to the read gap, for reading recorded data from a magnetic recording medium;

a transducing element, coupled to the second magnetic flux guide, for generating signals for writing data to the magnetic recording medium;

a first polarization conductor, disposed proximate to the flux sensing means, for biasing the flux sensing means to detect signals recorded on the magnetic recording medium; and a second polarization conductor, disposed proximate to the second magnetic flux guide, for generating an applied field to decrease the permeability of the second magnetic flux guide, wherein the second flux guide includes a protrusion that increases the contribution of shape anisotropy to the applied field to increase the applied field during the read process.

24. The magnetic head of claim 23 wherein the first polarization conductor biases the flux sensing means to 50% saturation.

25. The magnetic head of claim 23 wherein the second flux guide comprises permalloy having a predetermined magnetic field orientation.

26. The magnetic head of claim 25 wherein the application of a field to the second flux guide by the second polarization conductor switches the magnetization of the permalloy.

27. The magnetic head of claim 23 wherein the permeability of the second flux guide is reduced by a factor of four.

28. The magnetic head of claim 23 wherein the first flux guide has a width less than the second flux guide, the second flux guide providing a write-wide attribute and the first flux guide providing a read-narrow attribute.

29. The magnetic head of claim 23 wherein the first polarization conductor and the second polarization conductor are connected in series, and wherein current is applied to the conductors to bias the flux sensing means and to generate the applied field to decrease the permeability of the second magnetic flux guide.

* * * * *

UNITED STATES PATENT AND TRADEMARK OFFICE
CERTIFICATE OF CORRECTION

PATENT NO. : 5,742,457

DATED : APRIL 21, 1998

INVENTOR(S) : SIMMONS ET AL.

It is certified that error appears in the above-identified patent and that said Letters Patent is hereby corrected as shown below:

Col. 2, line 39: "provide" should read —provided—

Col. 3, line 49: "cross sectional" should read —cross-sectional—

Col. 5, line 51: "detailed" should read —detail—

Col. 6, line 60, claim 9: "recording" should read —recorded—

Col. 6, line 60, claim 9: "recorded" should read —recording—

Signed and Sealed this

Fifth Day of October, 1999

Attest:

Q. TODD DICKINSON

*Attesting Officer*     *Acting Commissioner of Patents and Trademarks*